Patented Aug. 18, 1936

2,051,219

UNITED STATES PATENT OFFICE 2,051,219

PREPARATION OF HYDROXYALKYL ESTERS OF THE DICARBOXYLIC ACID ESTERS OF CELLULOSE AND THE PRODUCTS RESULTING THEREFROM

Carl J. Malm and Charles R. Fordyce, Rochester, N. Y., assignors to Eastman Kodak Company, Rochester, N. Y., a corporation of New York No Drawing. Application September 23, 1933, Serial No. 690,762

15 Claims. (Cl. 260—101)

The present invention relates to the preparation of a hydroxyalkyl ester of a dicarboxylic acid ester of cellulose by reacting upon the cellulose ester or its salt with an alkylene oxide.

Heretofore the reaction between cellulose itself and an alkylene oxide has been accomplished; however, in that case it has been necessary to use caustic alkali, the action of which is degrading upon the cellulose. In that case, also, in addition to the cellulose being degraded, the group added by the alkylene oxide is attached to the cellulose itself so that the resulting product is of the cellulose ether type.

One object of our invention is to provide a process of incorporating hydroxyalkyl groups by means of an alkylene oxide into a cellulose derivative without any danger of degrading the cellulose. Another object of our invention is to provide a process of esterifying the carboxyl uncombined with the cellulose in a dicarboxylic acid ester of cellulose. Other objects will appear herein.

We have found that if a dicarboxylic acid ester of cellulose or its salt is treated with an alkylene oxide, a hydroxy alkyl ester of the dicarboxylic acid ester of cellulose is formed. The starting material may either be a simple dicarboxylic acid ester or it may be a mixed ester in which either some or all of the acyl groups may be dicarboxylic.

The preparation of the cellulose esters and their salts, which may be employed as the starting material of the present process is disclosed broadly in Malm and Waring application Serial No. 380,252, filed July 22, 1929. These esters are prepared by treating cellulose or an esterifiable cellulose derivative, such as a cellulose acetate or a cellulose ether such as ethyl cellulose having esterifiable hydroxyl groups with a dicarboxylic anhydride, such as phthalic, in the presence of an organic base, such as pyridine, which results in the pyridine salt of the dicarboxylic acid ester of cellulose. To form the ester with free carboxyl proper treatment with a dilute acid is employed to remove the pyridine. The salts may be prepared by treating the ester containing the free carboxyl with a water-soluble hydroxide, such as that of sodium. The cellulose esters, which may be employed as the starting material, may be the esters of phthalic acid, such as are disclosed and claimed in Malm and Waring application Serial No. 380,252, the esters of succinic acid such as are disclosed and claimed in Malm and Waring application Serial No. 627,150, filed July 30, 1932, or the esters of diglycollic acid such as are disclosed and claimed in Malm and Fordyce application Serial No. 627,147, filed July 30, 1932. Any of the salts of the dicarboxylic acid esters of cellulose, especially those of the alkali metals such as are disclosed in Malm and Waring application Serial No. 627,149, filed July 30, 1932, may be employed as the starting material of a process in accordance with the present invention.

The reaction in accordance with the present invention appears to be characteristic of the alkylene oxides in general as in every instance in which processes have been carried out in accordance with the present invention the process has proceeded in the manner described. In view of the fact that the lower members of this series, such as the oxides of ethylene, propylene and butylene, are the more common and have greater reactivity, their use is preferred in the present process.

The following examples illustrate processes embodying our invention:

Example I 10 lbs. of cellulose acetate phthalate having a phthalyl content of 33% are dissolved in a mixture of 40 lbs. of 1:4 dioxan and 10 lbs. of propylene oxide. The solution is refluxed for 4 hrs. at approximately 100° C. The solution is then allowed to stand without heating for a number of days. It is then diluted with acetone and precipitated in a large volume of water, whereupon the resulting product is washed and dried. The cellulose acetate beta hydroxy propyl phthalate prepared in accordance with the above procedure contains 6.1% free phthalyl as compared to 33% in the original material. It is soluble in acetone, methyl acetate, ethylene chloride-alcohol (4:1) and benzene-alcohol (2:1).

Example II 10 lbs. of cellulose acetate phthalate having a phthalyl content of 33% are dissolved in 50 lbs. of propylene oxide and the mixture is allowed to stand at room temperature for a number of weeks. The solution is then diluted with acetone and precipitated in a large volume of water whereupon the resulting product is washed and dried. The cellulose acetate beta hydroxy propyl phthalate prepared in accordance with the above procedure contains 0.58% free phthalyl as compared to 33% in the starting materials. It is soluble in acetone, methyl acetate, ethyl acetate, ethylene chloride, propylene chloride-methyl alcohol (4:1), chloroform, benzene-methyl alcohol (2:1) and toluene-methyl alcohol (2:1).

Example III 10 lbs. of cellulose phthalate having a phthalyl content of 60% are mixed with 50 lbs. of 1:4 dioxan and 20 lbs. of propylene oxide and the mixture is refluxed for 24 hrs. on a steam bath. The cellulose phthalate is at first insoluble in the reaction mixture but, after being heated only a few minutes, begins to swell and pass partially into solution. After a few hours, complete solution takes place. The mixture is then precipitated in a large volume of water and the cellulose hydroxy propyl phthalate formed is washed and dried. Upon analysis, it exhibits a free phthalyl content of 1.6%.

*Example IV*

10 lbs. of a sodium salt of a cellulose acetate phthalate are dissolved in 3 gals. of water and 10 lbs. of ethylene oxide are stirred into the solution, and the whole is allowed to stand at room temperature for several days, or until an insoluble jell is formed. This jell is dissolved in acetone and precipitated in dilute acetic acid. The product formed is very similar to that formed in Examples I and II above.

The reaction which appears to take place in, for instance, Example I may be represented as follows:

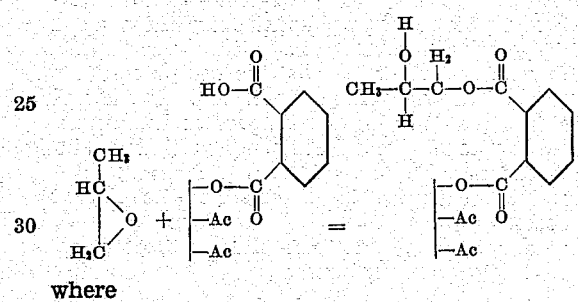

where

|—
|
|— represents a $C_6$ unit of cellulose and Ac represents acyl groups, such as acetyl, propionyl, butyryl or the like. Obviously the phthalyl content may differ from that shown. When ethylene oxide is employed, the reaction may be represented as follows:

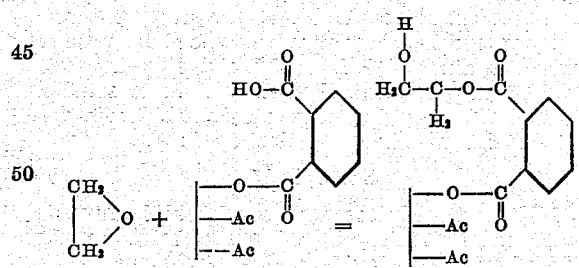

When an aliphatic dicarboxylic acid ester of cellulose, such as a succinate is employed, the reaction which appears to take place may be represented as follows:

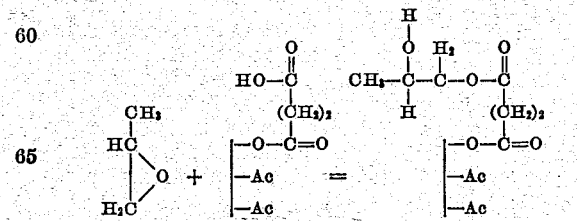

It is to be understood that where the term "dicarboxylic acid ester of cellulose" is employed herein, it refers to either those esters in which the second carboxyl of the dicarboxylic acid radical is unesterified or to the salts of those esters. The structural formulae herein are illustrative and are to be understood as not restrictive as to the proportions of the groups or radicals present in the compound represented.

What we claim as our invention is:

1. A process of preparing a hydroxy aliphatic ester of a dicarboxylic acid ester of cellulose which comprises reacting upon the dicarboxylic acid ester of cellulose with an alkylene oxide.

2. A process of preparing a hydroxy aliphatic ester of a dicarboxylic acid ester of cellulose which comprises reacting upon a cellulose ester containing dicarboxyl and other acyl groups with an alkylene oxide.

3. A process of preparing a hydroxy aliphatic ester of a phthalic acid ester of cellulose which comprises reacting upon the phthalic acid ester with an alkylene oxide.

4. A process of preparing a hydroxy aliphatic ester of a phthalic acid ester of cellulose which comprises reacting upon a cellulose ester containing phthalyl and other acyl groups with an alkylene oxide.

5. A process of preparing a hydroxy propyl ester of a dicarboxylic acid ester of cellulose which comprises reacting upon the dicarboxylic acid ester of cellulose with propylene oxide.

6. A process of preparing a hydroxy propyl ester of a dicarboxylic acid ester of cellulose which comprises reacting upon a cellulose ester containing dicarboxyl and other acyl groups with propylene oxide.

7. A process of preparing a hydroxy propyl ester of a phthalic acid ester of cellulose which comprises reacting upon the phthalic acid ester with propylene oxide.

8. A process of preparing a hydroxy propyl ester of a phthalic acid ester of cellulose which comprises reacting upon a cellulose ester containing phthalyl and other acyl groups with propylene oxide.

9. A process of preparing a hydroxy ethyl ester of a dicarboxylic acid ester of cellulose which comprises reacting upon the dicarboxylic acid ester of cellulose with ethylene oxide.

10. The cellulose compound represented by the formula

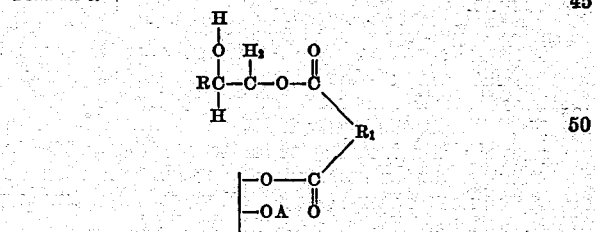

in which

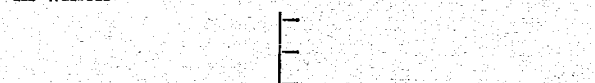

represents a $C_6$ unit of cellulose, A represents either H, an acyl, an alkyl or an

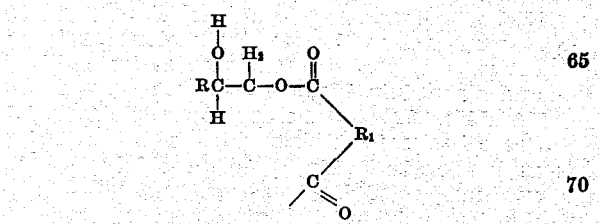

group, R represents either H or an alkyl radical and $R_1$ represents either an alkyl or an aryl group.

11. A hydroxy aliphatic ester of a dicarboxylic acid ester of cellulose.

12. A hydroxy propyl ester of a dicarboxylic acid ester of cellulose.

13. A hydroxy aliphatic ester of a phthalic acid ester of cellulose.

14. A hydroxy propyl ester of a phthalic acid ester of cellulose.

15. A hydroxy ethyl ester of a dicarboxylic acid ester of cellulose.

CARL J. MALM.
CHARLES R. FORDYCE.